(No Model.) 4 Sheets—Sheet 1.

C. W. THOMPSON.
VALVE MECHANISM FOR ENGINES.

No. 605,030. Patented May 31, 1898.

WITNESSES—
F. W. Wright
S. E. Connor

—INVENTOR—
Courtenay William Thompson
BY Howson & Howson
HIS ATTORNEYS—

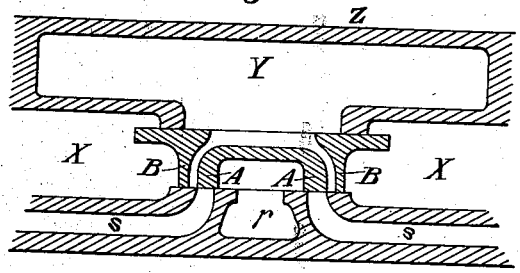
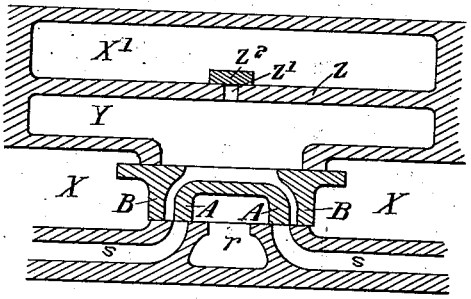
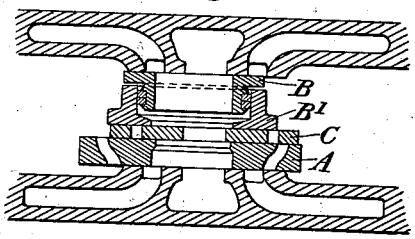
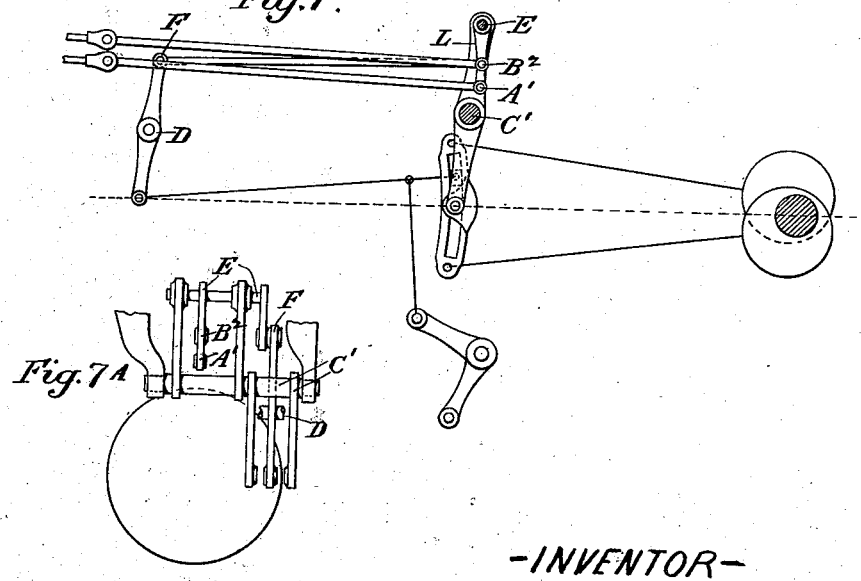

(No Model.)
4 Sheets—Sheet 3.
C. W. THOMPSON.
VALVE MECHANISM FOR ENGINES.
No. 605,030.
Patented May 31, 1898.
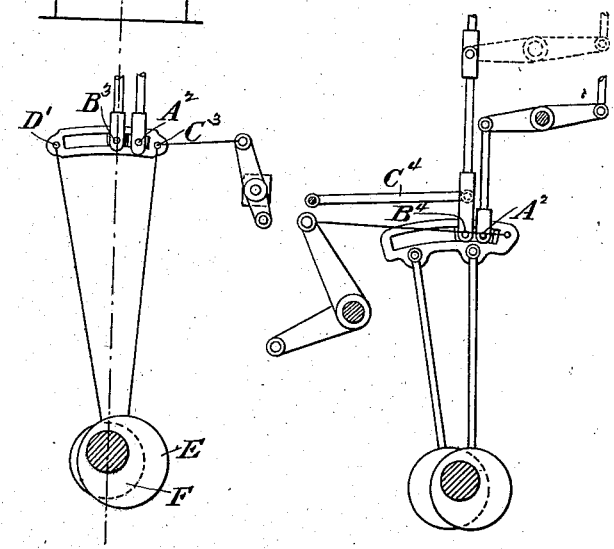
-WITNESSES-
INVENTOR
Courtenay William Thompson
BY
Howson & Howson
HIS ATTORNEYS-

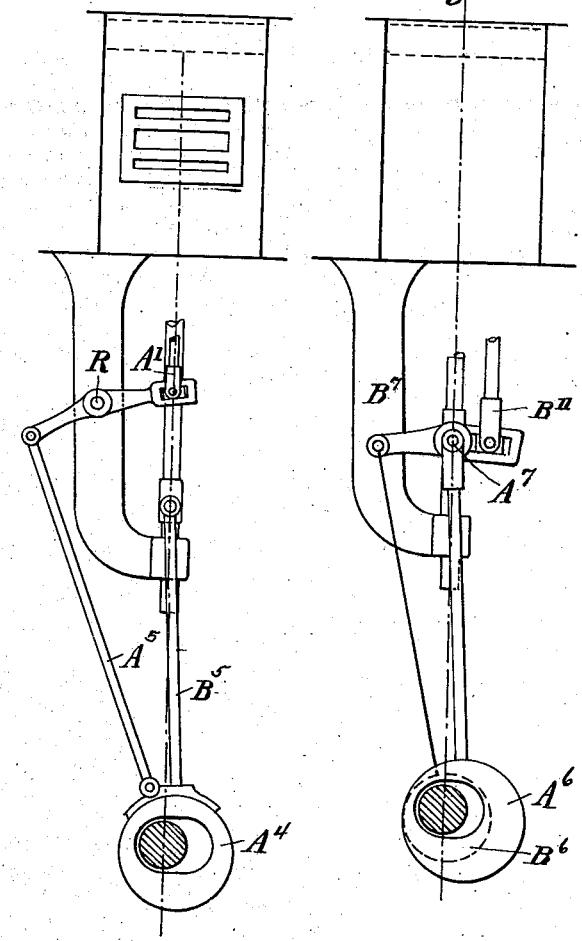

United States Patent Office.

COURTENAY WILLIAM THOMPSON, OF LONDON, ENGLAND.

VALVE MECHANISM FOR ENGINES.

SPECIFICATION forming part of Letters Patent No. 605,030, dated May 31, 1898.

Application filed October 24, 1896. Serial No. 609,936. (No model.) Patented in England April 16, 1896, No. 8,049.

*To all whom it may concern:*

Be it known that I, COURTENAY WILLIAM THOMPSON, mining-engineer, a subject of the Queen of Great Britain, and a resident of 30 College road, Bromley, London, in the county of Kent, England, temporarily residing at Waymouth street, Adelaide, in the Province of South Australia, have invented new and useful Improvements in Valves and Valve Mechanisms for Engines Operated by Steam or other Expansible Motive Agent, (for which I have obtained Letters Patent in Great Britain, No. 8,049, dated April 16, 1896,) of which the following is a specification.

The principal object of my invention is to provide valves whereby the exhaust or cushioning conditions of the motive fluid (which I will hereinafter refer to as "steam") can be controlled or regulated independently of or suitably for the regulation of steam cut off by providing a cushioning-space between the main and the cut-off valves, which receives compression from both ends of the cylinder alternately, and to provide valve mechanisms to increase the efficiency of the exhaust conditions in relation to the distribution of steam in the engines and to suit the varying conditions of reversing or non-reversing engines.

Figure 1:
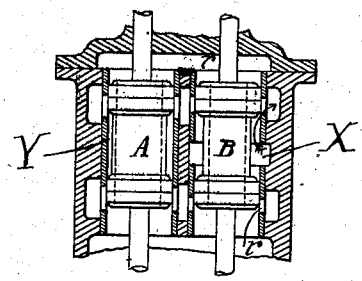
Figure 2:
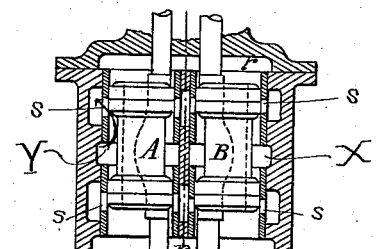
Figure 3:
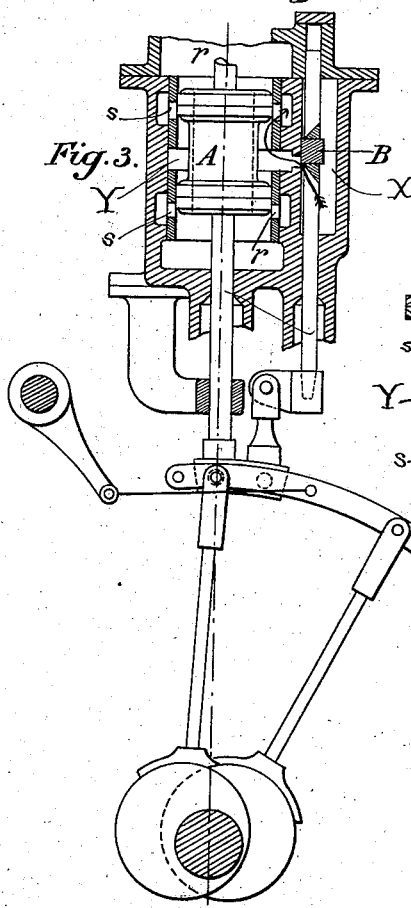
Figure 4:
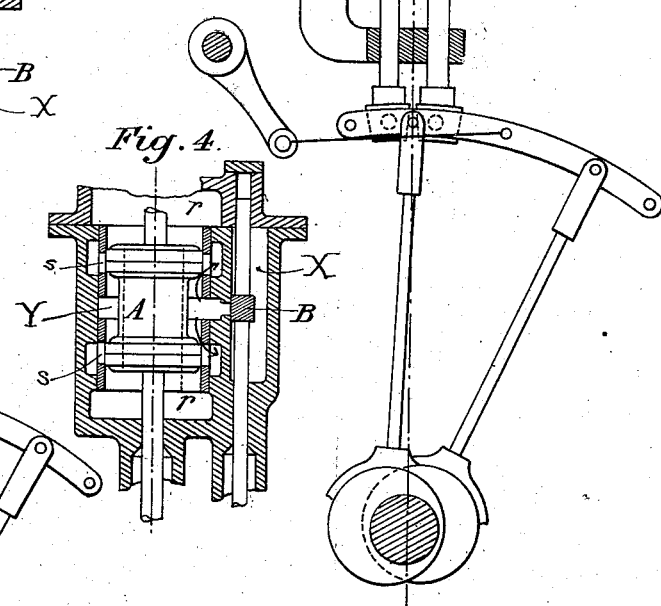
Figure 5:
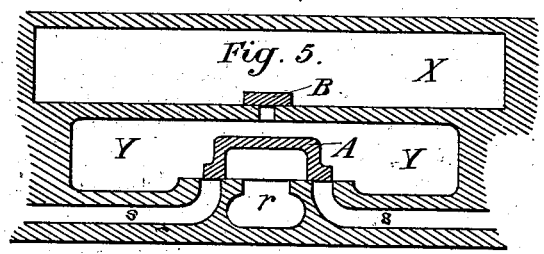

Figure 1 is a sectional view illustrating a valve mechanism according to my invention. Fig. 2 is a sectional view of a slight modification of valve mechanism with linkage-operating mechanism. Fig. 3 is a view similar to Fig. 2 of another modification. Fig. 4 is a sectional view of another modification of valve mechanism. Fig. 5 is a sectional view of the flat valve mechanism equivalent to that shown in Fig. 4. Figs. 6, 6ᴬ, and 8 are sections showing other modifications of valve mechanism. Figs. 7 and 7ᴬ are diagrammatic views of a reversing mechanism; and Figs. 9, 10, 11, and 12 show different forms of linkage for controlling the valves, as hereinafter explained.

In some instances I provide a separate exhaust-valve to be used as an auxiliary to and to be controlled independently of the main valve when such main valve operates for both steam and exhaust. For instance, in Fig. 1 of the accompanying diagrams the valve B represents the main valve (for simplicity and to reduce clearance the system is of inside steam type) controlling both steam and exhaust in the ordinary way, whereas the valve A only controls the exhaust, but is shown with no inside lap, so as to be open to the cushioning. The steam may also be admitted to such a valve, as A, when the greater power is required, the steam-chest being indicated by X, steam-ports to cylinders by $s$, and exhaust by $r$ in all the figures.

I will describe the nature of my invention and the manner in which it may be performed by reference to the examples illustrated in the accompanying diagrams, but I wish it to be understood that these are only examples in elucidation of my invention and that I do not limit myself to the particular devices shown.

Fig. 1 has already been described, but in connection with the operating mechanism the valve B will always operate best with more angular lead and less travel than those of the valve A.

Any of the valves described in this specification may operate with any suitable gears. For instance, the valve A, Fig. 5, may be operated by any suitable main valve-gear and the valve B, Fig. 5, by any suitable expansion-gear, and any mechanism herein described may operate with any suitable valve system—such, for instance, as any ordinary and suitable expansion-valve system.

The valve system shown in Fig. 2 is practically the same as that in Fig. 1, but the mechanism is such that the spindles cannot pass directly to the centers of the valve-pistons. This valve system is only suitable to be used under the conditions according to my invention for forward running, but it is shown in connection with reversing mechanism, such as a marine engine, where the economy in reverse running is of little or no importance and where this can be sacrificed for the sake of economy in forward running.

I provide two blocks in the one controlling-link, which give the valve B more lead and less travel than those of the valve A. The reverse, however, is the case when the engine is reversed. The forward half of a reversing link, for example, (or its equivalent,) may be used in this manner for non-reversing engines. When such a mechanism with two blocks or valve-pins in the one link is used with such an engine as a locomotive where forward and reverse working are important, then the ports and valve-faces of the valve A must be the same as those in the valve B, the one valve being for steam admission in forward and the other in reverse running alternatively. Steam is then only admitted to one valve at one time—viz., the one having the most lead and the least travel—but when a great quantity of steam is required then such steam may be admitted to both valves.

In Fig. 3 the mechanism is equivalent to that shown in Fig. 2, the one block with the two valve-pins in it and in the one link producing equivalent effects on the valves.

The principal duty of the valve A is to control the exhaust, but it also regulates the moment for admitting steam when it is necessary, as the steam controlling or expansion valve B opens too early. This valve and gear may be used, for example, for marine engines; but the most useful marine-engine valve is that shown in Fig. 4, operated by such a gear as that shown in Fig. 3. The steam-admission valve B may be of flat piston or other form. In Fig. 4 likewise the valve B must have more lead and less travel than those of the valve A, whereas unlike the valve B in Fig. 3 the lap of the valve B in Fig. 4 is so proportioned that it regulates both the opening and closing to steam. Both the valves A and B are shown in the central position of their travel. In this case the valve A may have no inside lap at all, and consequently all the clearance-space may be in communication with the cushioning of exhaust prior to opening to the steam. This is a very beneficial arrangement, as the clearance-space may be so proportioned in capacity as to regulate the intensity of the cushioned or back pressure under the varying conditions of the cut-off. This arrangement is most useful in compound engines, where the pressure of the exhaust varies in proportion to the amount of steam used. This beneficial effect is further increased and rendered applicable to both simple and compound engines, as shown in the valve-faces of the valve B in Fig. 4, by slightly cutting out the inside or steam lap and by adding a slightly greater amount of outside or exhaust lap relatively to the cylinder-ports, so as to have the clearance or cushioning space filled by steam just previous to exhaust and so as to transfer the steam under such pressure to the other end of the cylinder. The cushioning-space is never open to exhaust, but is always open to the steam end of the cylinder, so that while it prevents any excessive cushioning all the work done in cushioning is given back in full. This effect is produced by varying the movement of the exhaust or cushioning valve, as well as that of the steam-valve, and in contradistinction to the ordinary expansion-valve gear. The plates and ports of the valve B may be doubled or trebled or further multiplied.

The valve B may be given precisely the same movement as that given to the valve A when the clearance or cushioning space will require to be larger than if the valve B had more lead and less travel than those of the valve A, as in the former case the compression will always be greater than in the latter case.

With such a valve as A in Fig. 4, for example, when there is little or no steam lap, the same size of steam-opening can be effected with half the travel that is necessary with an ordinary valve. The exhaust-ports may then be doubled, while the steam-port is only single, without increasing the weight of the valve when the travel is halved and retaining the diameter of the valve equally full port-openings are obtained with half the travel of the heavy valve, whereas the small valve B requires very little moving, and simultaneously the full advantage of the suitably-proportioned cushioning-space is provided for the variable amounts of steam consumed.

For very high speeds and powers the steam may be admitted directly to the cushioning-space between the two pistons of the valve A and in addition to the steam admitted through the valve B.

The arrangement shown in Fig. 4 has another great advantage, that it entirely provides against the trouble which exists with piston-valves of so closing the ports as to inclose condensed water and not permitting it to escape and the consequent danger of knocking out the cylinder end. By the arrangement Fig. 4 free access is provided from the cylinder to the cushioning-space and if necessary thence into the valve-chest through the expansion-valve, which rises readily off its seat to any access of pressure. The cushioning-space can besides be readily drained by a relief or other valve placed at its lowest point. In this and other valve systems herein the steam-admission valve B may be operated by a shaft-governor. If the engine be reversed, then steam may be admitted directly into the steam or cushioning space of the valve A and the unreversed valve B rendered inoperative.

The valve arrangement shown in Fig. 5 is the flat valve equivalent of that shown in Fig. 4 and includes slide-valves whether of flat piston, oscillating, or other kind.

In Fig. 5 the valves A and B are equivalent to the valves A and B, respectively, in Fig. 4. X is the steam-chest, and Y is the clearance or cushioning space. When a cushioning-space is provided in the manner shown in Figs. 4 and 5, there can be no knocking of or inclosing of condensed water in the cylinder, and the bulk of the cushioning-space should be low down, with a relief or other valve at the lowest point.

The combination-valve A B shown in Fig. 6 gives the same results as those given by the arrangements Figs. 4 and 5, when the slide A of Figs. 4 and 5 has the same movement as those of the valve B of Figs. 4 and 5. Thus in Fig. 6 the passages in the valve between the faces A and B communicate with the cushioning-space Y and with the two ends of the cylinder, whereas the faces B B control the steam distribution in the same manner, the faces A A controlling the exhaust and cushioning in the particular manner according to this invention. The valves A B may be fitted or balanced in the steam-chest X in any convenient manner, and this valve may be very beneficial when operated by a shaft-governor eccentric, or generally when there is only one slide both for variable expansion and exhaust.

The valve arrangement in Fig. 6 may be modified by providing a port in the face Z and an expansion-valve to operate on the back of such port, and, further, by providing more steam lap at B B. The auxiliary expansion-valve will be operated so as to always cut off the steam early, (see Fig. 8 for a suitable nature of mechanism for this,) whereas the modified faces B B would only operate for steam admission and cut-off for the latter points of cut-off. This modified form will be most useful with a reversing mechanism in which both valves can be controlled by one lever. (See Fig. 9.) This modified form, Fig. 6, is best seen in Fig. 6$^A$. The lap is increased at the faces B B. The expansion-valve Z$^2$ operates the port Z' on the back of the plate Z. In Fig. 6$^A$, X' is an auxiliary steam-chest. This expansion-valve Z$^2$ only operates for early cut-off of steam, whereas the valve A B operates only for late cut-off of steam. Consequently the valve A B never has its travel so much reduced and never effects so heavy cushioning as does an ordinary simple valve.

Equivalent arrangements to those shown in Figs. 6 and 6$^A$ are, for example, as follows: The valve in Fig. 6 may carry a part of the cushioning-space, moving as a part of itself, and, further, a steam-admission valve may operate in connection with this cushioning-space—as, for example, it does in Fig. 6$^A$. As illustrated in Figs. 5, 6, 6$^A$, 7, and 9, for instance, the various slides may be interchanged and combined in any suitable manner that their particular properties suggest. This cushioning-space, it will be seen, is the space between the main valve and the cut-off valve, and it receives compression from both ends of the cylinder alternately, and through this same space the two ends of the cylinder alternately communicate with one another. This space may be regulated in capacity to suit the pressure of the steam in use, so that the pressure of the compression at the end of each stroke of the piston may be raised under varying conditions of cut-off as near as possible to that of the live steam in the steam-chest. Again, according to my invention this space may be of any shape, with the object in some instances of placing the two valves at different parts of the cylinder. For instance, the main valve may be on the side of the cylinder and the cut-off valve on the top, when the cut-off valve will open suitably to the cushioning-space, which space again will communicate with the cylinder through the main valve.

In describing the valve-operating mechanism to effect the objects of this invention in respect of varying angular lead and exhaust or cushioning conditions I will refer for brevity to the valve whose principal duty, according to this invention, is to regulate the steam as the "admission" valve, and to the valve whose principal duty, according to this invention, is to regulate the exhaust or cushioning as the "exhaust" or "cushioning" valve.

I will particularly describe Fig. 7, for example, in connection with Fig. 6$^A$. Fig. 7 is an elevation, and Fig. 7$^A$ a side view. The rocking shaft C' supports an ordinary reversing-link, at or about the center of the latter, and obtains a rocking movement from it. This movement is transmitted to the shaft E. The ordinary valve movement is transmitted by the block to the lower end of the lever of the rocking shaft D, through which the movement is transmitted to the upper end F. The rocking arm E B$^2$ A' receives one movement from its rocking shaft E and another movement from an arm connected by suitable attachment to the rocking arm F. Thus the rocking arm B$^2$ A' has movements equal to those of the always forward portion of a reversing-link, and B' has always more angular lead and less travel than has A. The pin B$^2$ may operate the admission-valve, and the pin A' may operate the exhaust or cushioning valve. The single controlling-lever L controls both of the pins A' and B$^2$, so that the pin B$^2$ will always have an earlier cut-off movement than has the pin A', and A' may therefore operate the valves Z$^2$ and A B, respectively, in Fig. 6$^A$.

In Fig. 8 the valve A is the exhaust or cushioning valve. B is the steam-admission valve, and B' is an auxiliary steam-admission valve operating on the back of the anchor-plate C$^2$. The valve B also controls the exhaust, effecting an early opening to exhaust when desired, but it will always close the exhaust before the valve A will close it. If the steam lap of the valve B be so increased that the valve B will not open to steam at all, then this valve may be used with the gear shown in Fig. 2. One block will be attached to the valve A and the other block will be attached to the valve B B'. As now it is the first of the two valve-slides A or B' to cut off steam that will control the admission of steam, so this valve, (modified as described,) Fig. 8, may be combined with the gear in Fig. 2 to operate equally well for forward or reverse working and is a very suitable combination for a locomotive. From the foregoing it will be seen that in the modified form of Fig. 8 the valve A and the valve B B' may each be alternately steam admission or exhaust valves, respectively, and according as the engine is running forward or reverse.

In Fig. 9 the main or exhaust or cushioning valve attached to the block $A^2$ is controlled by governor or otherwise in the same variable link as is the expansion or admission valve attached to the other block $B^3$. This is a non-reversing gear. The eccentric $E'$ is attached to the link at $C^3$, and the eccentric $F'$ is attached to the link at $D'$. $D'$ is the early cut-off, and $C^3$ is the late cut-off, end of the link. The early cut-off eccentric $F'$ is set opposite to the crank, and half its travel is about equal to the lead of the late cut-off eccentric $E'$ on either side of the center. This gear may be used with the arrangement Figs. 4, 8, and others. The block $B^3$ has always more lead and less travel than has the block $A^2$.

In the arrangement Fig. 10 the varying lead and travel properties are obtained, for example, from the one block in the reversing-link. There are two pins in this block connected to two valve-rods. The two valve-rods are supported by reason of the one block being supported by the rod $C^4$. This gear is suitable, for example, for a locomotive, and the movements for the valves may be transmitted suitably by the rocking shafts. The pins $A^2$ and $B^1$ are alternately (and as the engine is reversed to and fro) applicable for an admission-valve and an exhaust or cushioning valve, respectively, and they may operate, for example, with the valves shown in Figs. 2 and 8. There may be three pins in the one block or three blocks in the one link, and, for example, the two outside ones may be admission-valves alternately.

In the arrangement Fig. 11 the varying lead and travel properties are obtained, for example, under the following conditions: $A^4$ is a shaft-governor eccentric, and is operated with the variable movement, the exhaust or cushioning valve rod $B^5$, while the movement for the admission-valve rod $A^5$ is obtained at such an angle that $A^5$ operates always with more lead than does $B^5$. This effect is produced by attaching $A^5$ to a point in the eccentric-strap different from that of $B^5$. The rods $A^5 A^5$ operate through the medium of the rocking shaft R.

In the arrangement Fig. 12 the varying lead and travel properties are obtained, for example, under the following conditions: $A^6$ is the shaft-governor eccentric. $B^6$ is an eccentric set opposite to the crank, and its half travel is about equal to the lead of $A^6$ on either side of the center. The eccentric $A^6$ is shown as operating the admission-valve directly, and it is attached to the link $A^7 B^7$ at $A^7$. The eccentric $B^6$ is attached to this link at $B^7$. In varying both the admission and exhaust or cushioning valves $A^7$ has always more lead and less travel than has $B^7$.

It is understood that figures of the drawings only illustrate some modifications of the main principle involved, as the main and cut-off valves may be of any form or design which will produce the effects of the invention as described, which requires, with the arrangement of valve-faces and port-faces described, that there shall be a cushioning-space between the main and cut-off faces of the two valves in the valve system in order to produce the effects described, and the two valves need not be placed relatively to each other, as shown in Figs. 4 and 5, but may be placed in some instances the one on the top of the cylinder, say, and the other on the side or otherwise, provided that they will produce the effect provided for and described in the specification.

Having now particularly described and ascertained the nature of my said invention and in what manner the same is to be performed, I declare that what I claim is—

1. In fluid-operated engines, the combination of a cylinder, with the main valve or valves, and the cut-off valve, having a cushioning-space located between the main and cut-off valve-faces and adapted to receive compression alternately from both ends of the cylinder, and mechanism for operating said valves, whereby the exhaust and cushioning conditions are controlled independently of the control of the variable expansion, substantially as described.

2. In fluid-operated engines, the combination of a cylinder, with the main valve or valves, and the cut-off valve, having a cushioning-space located between the faces of the main and cut-off valves and adapted to receive compression alternately from both ends of the cylinder and to alternately place the ends of the cylinder in communication, and mechanism for operating said valves, whereby the exhaust and cushioning conditions are controlled independently of the control of the variable expansion, substantially as described.

In testimony that I claim the foregoing as my invention I have signed my name, in the presence of two witnesses, this 31st day of August, 1896.

COURTENAY WILLIAM THOMPSON.

Witnesses:
CHARLES NICHOLAS COLLISON,
ARTHUR GORE COLLISON.